Nov. 12, 1963
R. J. OTT ETAL
3,110,847
MAGNETIC SURFACE PLATE
Filed June 15, 1961
2 Sheets-Sheet 2
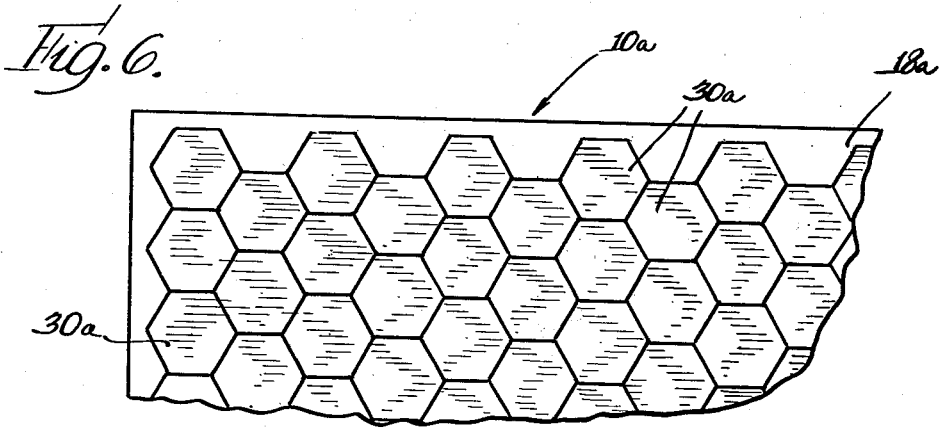
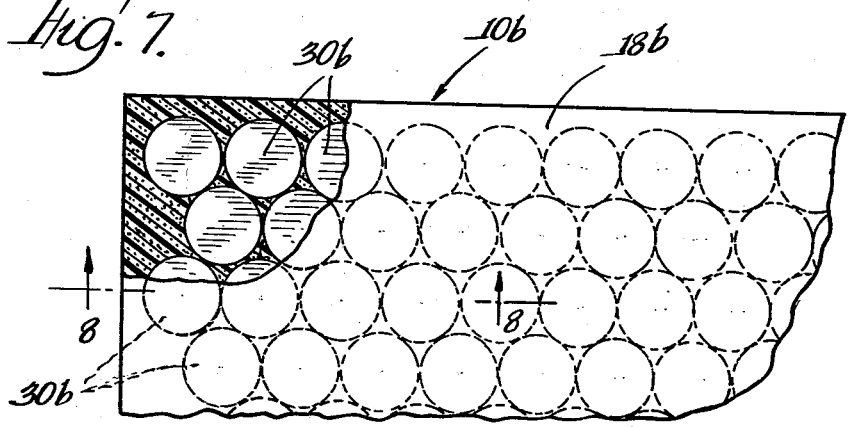
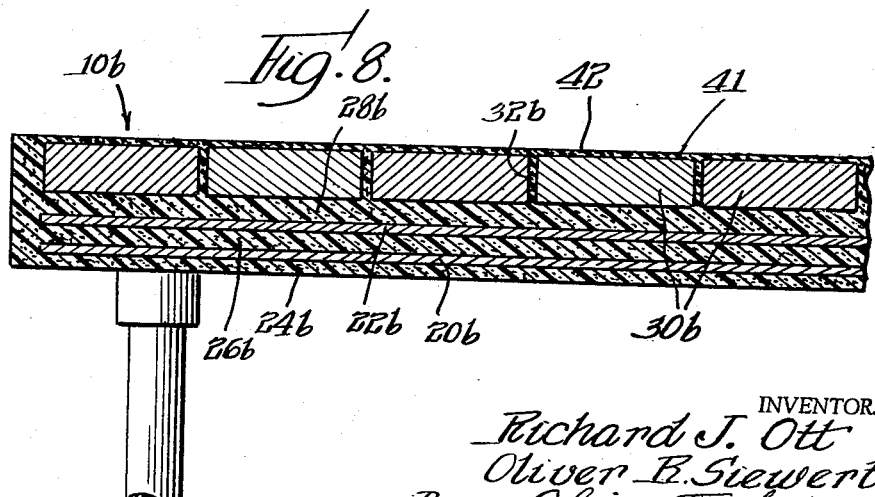
INVENTORS
Richard J. Ott
Oliver B. Siewert
By: Olson, Trexler,
Wolters & Bushnell
Attys United States Patent Office 3,110,847
Patented Nov. 12, 1963

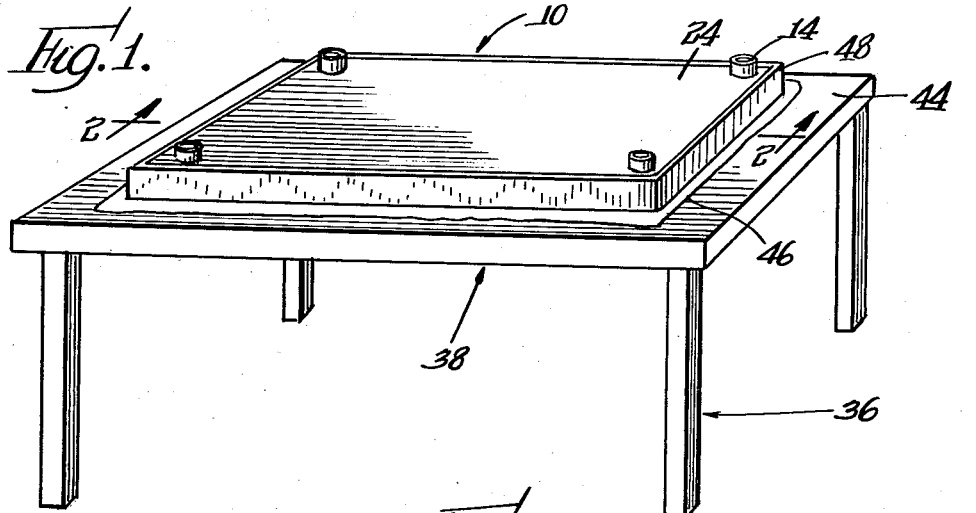
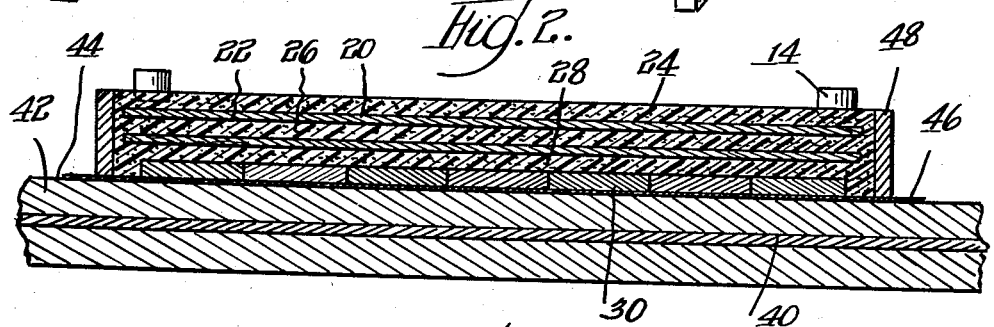
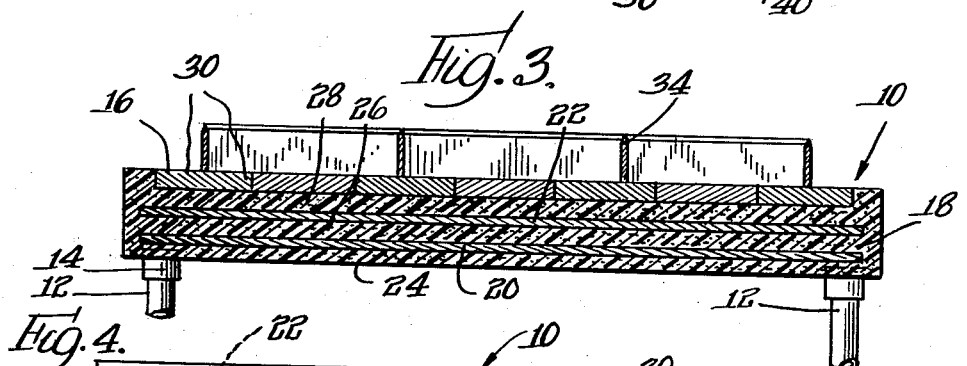
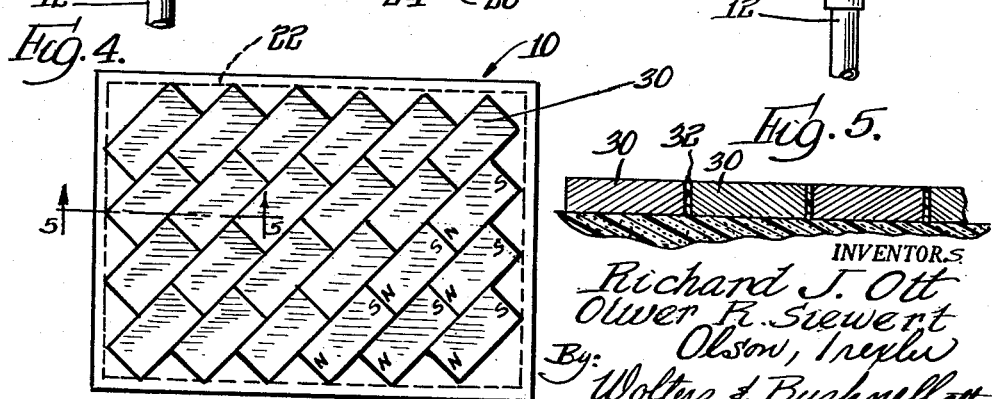
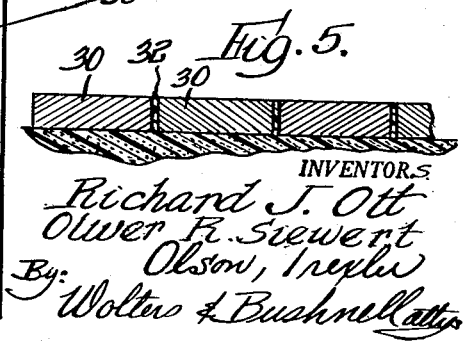

3,110,847
MAGNETIC SURFACE PLATE
Richard J. Ott, New Buffalo, and Oliver R. Siewert, Stevensville, Mich., assignors to Arro Plastics, Inc., Baroda, Mich., a corporation of Michigan
Filed June 15, 1961, Ser. No. 117,432
4 Claims. (Cl. 317—159)

The present invention relates to a novel surface plate structure and a method of making the same, and more specifically to a novel surface plate structure which is adapted to be used in connection with the production of various articles and which is especially suitable for use in connection with the manufacture of steel rule dies and the like as disclosed in our co-pending application Serial No. 94,535, filed March 9, 1961.

An important object of the present invention is to provide a novel magnetic surface plate or table and a novel method of making the same so as to obtain an accurate working surface and dimensional stability relatively easily and economically.

A further object of the present invention is to provide a novel magnetic surface plate or table of strong, rigid and relatively light weight construction.

Another more specific object of the present invention is to provide a novel magnetic surface plate or table utilizing a plurality of magnetic elements arranged for promoting effective magnetic retention of work pieces substantially regardless of the position or arrangement of such workpieces on the surface plate.

Other objects and advantages of the present invention will become apparent from the following description and the accompanying drawings wherein:

FIG. 1 is a perspective view showing a surface plate incorporating features of the present invention in an intermediate stage of production on a master surface or table;

FIG. 2 is an enlarged fragmentary sectional view taken along line 2—2 in FIG. 1;

FIG. 3 is a sectional view showing a finished surface plate or table incorporating features of the present invention and further showing the manner in which the surface plate is utilized for retaining a plurality of workpieces or blade elements during the construction of a steel rule die in accordance with disclosures of the aforementioned co-pending application;

FIG. 4 is a reduced plan view of a surface plate or table incorporating features of the present invention;

FIG. 5 is a fragmentary sectional view taken along line 5—5 in FIG. 4;

FIG. 6 is a fragmentary plan view showing a modified form of the present invention;

FIG. 7 is a fragmentary plan view showing another embodiment of the present invention; and FIG. 8 is an enlarged fragmentary sectional view taken generally along line 8—8 in FIG. 7.

Referring now more specifically to the drawings wherein like parts are designated by the same numerals throughout the various figures, a finished surface plate or table structure 10 incorporating features of the present invention is shown in FIGS. 3 and 4 and the method of making the surface plate in accordance with features of the present invention is partially shown in FIGS. 1 and 2. The finished surface plate is adapted to be supported on a plurality of leg members 12 which, if desired, may be detachably connected thereto by insertion into suitable socket elements 14. The leg and socket members may be provided with complementary threads so that the legs may be turned for adjusting the effective length thereof. In this manner the surface plate 10 may be adjusted or leveled so that an upwardly facing working surface 16 thereof is disposed horizontally.

As shown in FIGS. 2-4, the surface plate or table top structure 10 comprises a body 18 of plastic material. Sheets of relatively strong tough and light weight material such as plywood sheets 20 and 22 are embedded within the plastic body 18. Preferably, the strengthening and rigidifying sheets 20 and 22 are arranged and spaced apart so as to separate layers 24, 26 and 28 of the plastic body. It is to be noted that the plastic material of the body 18 which may or may not include a filler is substantially impervious to moisture and has a high degree of dimensional stability. Furthermore, the arrangement is such that the plastic material covers and seals the edges as well as the sides of the sheets 20 and 22 which, as indicated above, are formed of plywood and the like so that after such sealing, the sheets 20 and 22 will also have a high degree of dimensional stability.

Embedded in the uppermost layer 28 of the plastic material, are blocks 30 of magnetic material, which blocks are preferably permanently magnetized. The magnet elements or blocks 30 are preferably disposed in substantially abutting relationship. However, as a result of manufacturing tolerances and the like, small crevices or cracks usually appear between the blocks 30 as shown in a greatly exaggerated manner in FIG. 5, which crevices or cracks are substantially completely filled with portions 32 of the plastic body. These portions of the plastic material combined with the margins of the plastic body and the upwardly facing surfaces of the magnets which are ground or otherwise accurately finished so as to provide a smooth flat working surface. As shown in FIG. 4, the magnets 30 are arranged diagonally with respect to the generally rectangular outline of the surface plate. Furthermore, the magnets are arranged in rows with magnets in each row staggered with respect to magnets in adjacent rows. As a result, the lines or crevices between the magnets which are filled with the aforementioned portions 32 of plastic material are diagonally arranged and relatively interrupted. As shown by the locations of the letters "N" and "S" which designate the north and south poles, the magnets 30 are arranged so that each pole of each magnet is primarily adjacent an opposite pole of an adjacent magnet.

When producing the surface plate or table 10 in accordance with features of the present invention, a master table 36 is provided, which table includes a top structure 38. The table top 38 is provided with a core 40 of magnetic material such as steel plate for strengthening and rigidifying the table top. The core 40 is covered with a layer 42 formed from a suitable plastic material such as epoxy resin and provided with an accurately finished flat upper surface 44.

In order to initiate production of the surface plate 10, a thin sheet 46 of paper or the like is preferably placed on the surface 44 of the master table for facilitating subsequent removal of the finished surface plate. Then, a fence 48 having a rectangular or other desired outline is placed on the paper 46 so as to define a cavity in which the surface plate 10 is to be formed. Then the magnets 30 are arranged with their accurately finished side surfaces facing downwardly against the paper 46 and the layer 28 of the resinous material is applied over the magnets. This resinous material is initially in liquid form so that the above mentioned portions 32 thereof flow into the crevices between the magnet blocks. Then the sheets 22 and 20 of the plywood or the like and the layers 26 and 24 of the plastic material are alternately applied and the leg accommodating sockets 14 are partially embedded in the layer 24 of the plastic material. As indicated above, the plastic material is cast or similarly dispensed in liquid form and after the parts have been assembled in the manner described, the plastic material is hardened and cured in a known manner. It is to be noted that prior to the hardening of the plastic material, the magnets 30 are effectively magnetically connected with the plate 40 of the table top 38 so that the magnets are fixed with respect to each other. Furthermore, the magnetic connection between the magnets 30 and the plate 40 serves to clamp the magnets with their finished surfaces pressed firmly downwardly against the accurately finished upper surface 44 of the table top 38 and the thin paper 46 so that, as indicated above, the accurately finished surfaces of the magnetic blocks 30 will combine with each other and with the plastic material to provide the surface plate 10 with a smooth work surface 16.

After the plastic material has hardened, the surface plate 10 may be readily removed from the table top 38 by sliding it across one side edge of the table top until the magnetic connection between the blocks 30 and the plate or core member 40 is broken. The thin sheet of paper 46 facilitates such sliding movement since it prevents the plastic material 18 from sticking to the table top 38 and it also prevents scratching of the finished surface 44 of the table top. However, it is contemplated that in certain instances the paper sheet 46 need not be employed. In such instances the upper surface 44 of the table top may be coated with a suitable releasing agent, if desired, in order to prevent the plastic material of the surface plate from sticking thereto. After the finished surface plate has been removed from the table top 38, the fence or border structure 48 may be removed therefrom as shown in FIG. 3 and the leg members 12 may be inserted into the sockets 14. If desired, the fence or border structure 48 may be retained in a similar relationship with the plastic body of the surface plate so as to minimize any possibility of injury to the margins of the plastic body.

FIG. 6 shows another embodiment of the present invention which is similar to the structure described above as indicated by the application of identical reference numerals with the suffix *a* added to corresponding elements. This embodiment differs in that the magnets 30*a* are provided in the form of relatively small hexagonal members. The use of such hexagonal members arranged in substantially abutting relationship as shown in FIG. 6 minimizes the length of the straight junction lines between adjacent magnets so that any possibility of a part of the steel rule die structure resting solely on one of such lines is further minimized.

FIGS. 7 and 8 show still another embodiment of the present invention which is similar to the structures described above as indicated by the application of identical reference numerals with the suffix *b* added to corresponding parts. In this embodiment the magnet members 30*b* are provided with a circular configuration so as to eliminate completely straight junction lines between the magnets. This embodiment illustrates additional features, which, if desired, may also be included in the structures described above. More specifically, the plastic material of the table top structure is cast or otherwise formed so as to provide a thin layer 41 over the upper surfaces of the magnets 30*b*, which layer constitutes the upper or work surface of the table. The surface of the layer 41 is accurately and smoothly formed and it will be noted that this arrangement eliminates any possibility of irregularities or roughness occurring in the work surface of the table at the junctions between the magnets.

It is further to be noted that iron filings 42 or other suitable small magnetic particles are mixed in the plastic material as shown in FIG. 8. Such particles aid in distributing the magnetic field across the surface of the table structure for promoting proper retention of the steel elements against the table top during construction of a die.

While the preferred embodiments of the present invention have been shown and described herein, it is obvious that many structural details may be changed without departing from the spirit and scope of the appended claims.

The invention is claimed as follows:

1. A magnetic surface plate comprising flat, rigid and dimensionally stable body means including plastic material and a plywood member completely embedded and enclosed in said plastic material, said body means including an upper section of said plastic material having substantial thickness and located above said plywood member, said body means having a generally rectangular peripheral configuration, and a plurality of substantially juxtaposed magnetic blocks embedded in said upper section of said plastic material, said plastic material including portions extending into crevices between substantially abutting blocks, said blocks presenting upwardly facing surfaces combining with said portions and providing said surface plate with a substantially smooth planar upwardly facing work surface, and said blocks being arranged in a predetermined pattern having rows of blocks and having poles of the magnetic blocks disposed primarily adjacent opposite poles of adjacent blocks.

2. A surface plate, as defined in claim 1, which includes attachment means embedded in said plastic material, and leg members connected with said attachment means and depending from said body for supporting the body in a generally horizontal position.

3. A magnetic surface plate, as defined in claim 1, wherein a portion of said plastic material covers said magnets and provides a smooth upwardly facing work surface.

4. A magnetic surface plate, as defined in claim 1, which includes a filler of magnetic particles in said plastic material.

References Cited in the file of this patent

UNITED STATES PATENTS

| | | |
|---|---|---|
| 2,958,019 | Scholten et al. | Oct. 25, 1960 |
| 3,017,303 | Ayers | Jan. 16, 1962 |
| 3,024,392 | Baermann | Mar. 6, 1962 |